United States Patent [19]

Schuricht

[11] 4,285,434

[45] Aug. 25, 1981

[54] WALKING-BEAM CONVEYOR WITH ADJUSTABLE WIDTH GAUGING APERTURE

[75] Inventor: Henry A. Schuricht, Pontiac, Mich.

[73] Assignee: AMSTED Industries Incorporated, Chicago, Ill.

[21] Appl. No.: 32,548

[22] Filed: Apr. 23, 1979

[51] Int. Cl.³ .......................... B07C 5/06; B65G 25/02
[52] U.S. Cl. .................................. 209/625; 198/774; 209/678
[58] Field of Search .............. 209/625, 632, 633, 634, 209/658, 659, 660, 670, 675, 676, 677, 678, 679, 680; 198/488, 750, 766, 773, 774; 74/50, 55, 116, 122, 125

[56] References Cited

U.S. PATENT DOCUMENTS

| | | | |
|---|---|---|---|
| 2,497,768 | 2/1950 | Hallead | 198/774 |
| 3,132,554 | 5/1964 | Boudreau et al. | 74/125 X |
| 3,154,191 | 10/1964 | Schmidt | 198/774 |
| 3,762,538 | 10/1973 | Buchheit | 198/774 |
| 3,881,362 | 5/1975 | Beezer | 74/53 |

FOREIGN PATENT DOCUMENTS 958041  5/1964  United Kingdom ............ 209/678

*Primary Examiner*—David A. Scherbel
*Assistant Examiner*—Edward M. Wacyra
*Attorney, Agent, or Firm*—John L. Schmitt; Fred P. Kostka; Edward J. Brosius

[57] ABSTRACT

Elongated components such as piston pins may be sequentially fed at an entrance point onto a conveyor connected to a distant discharge point. The conveyor includes a pair of guides so spaced to allow the pins to fit loosely therebetween and a stop plate which limits downward movement of the pins. An elongated drive plate having a top edge positioned between the guides and below the pins is rotated in an elliptical-like pattern so that the top edge lifts the pins from the stop plate, moves the pins forward and then re-engages the pins with the stop plate at a point forward of the point of initial lifting. The pins thus may be conveniently stepped between the entrance point and the discharge point as well as accumulated and stored if such is required. The conveyor may include sorting sections to separate the pins into different groups having equal diameters where pins of varying diameters have been inadvertently mixed.

4 Claims, 8 Drawing Figures

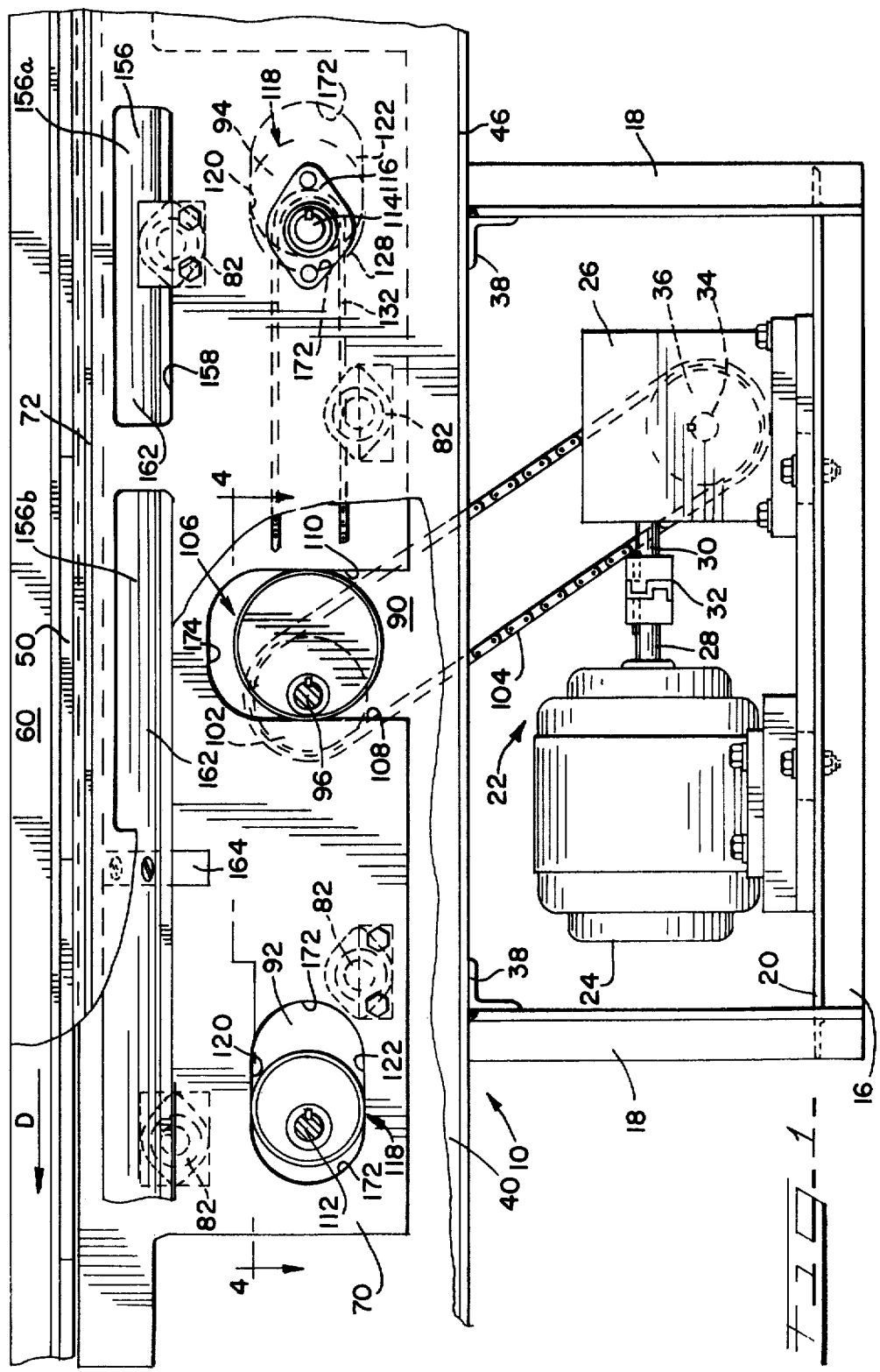

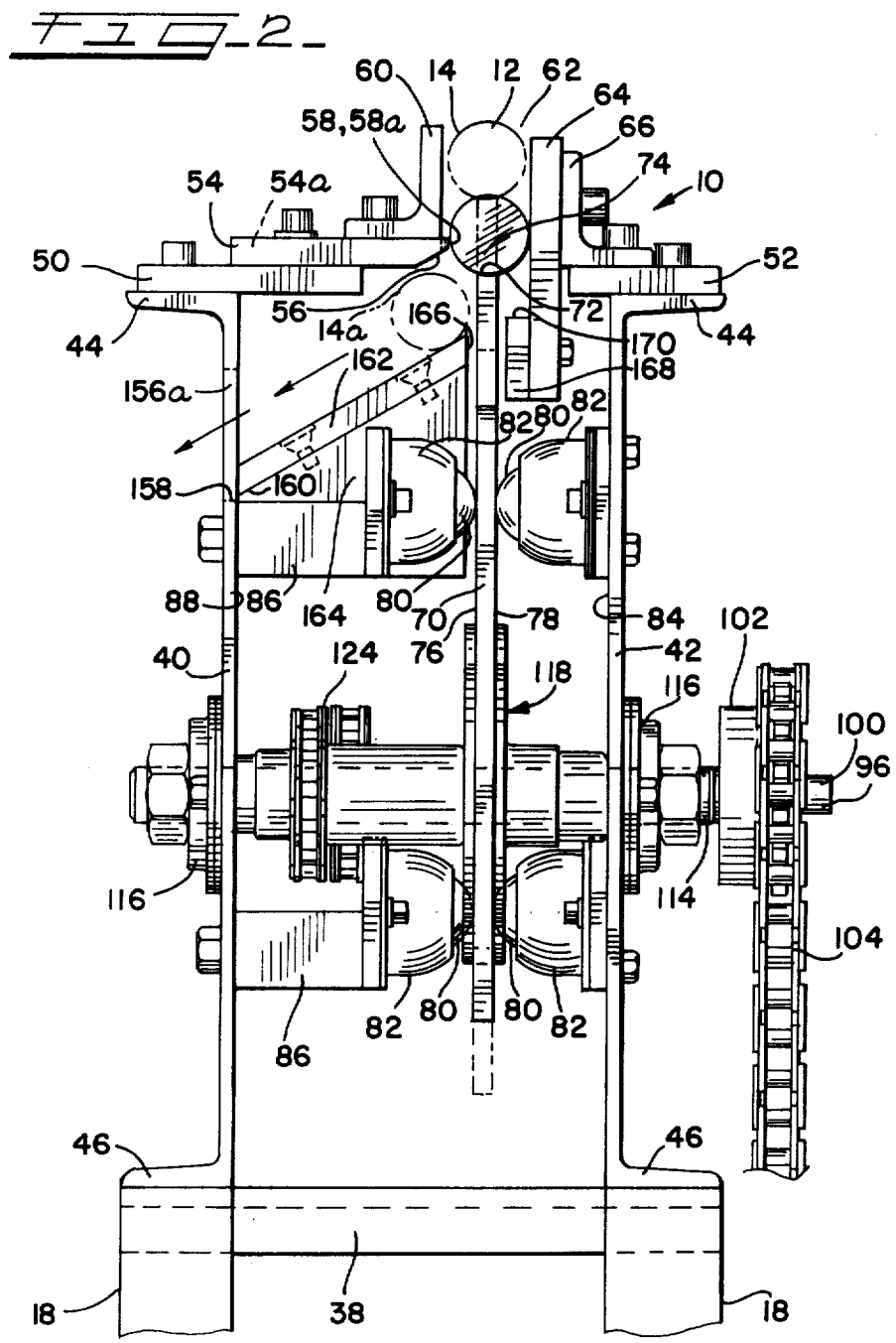

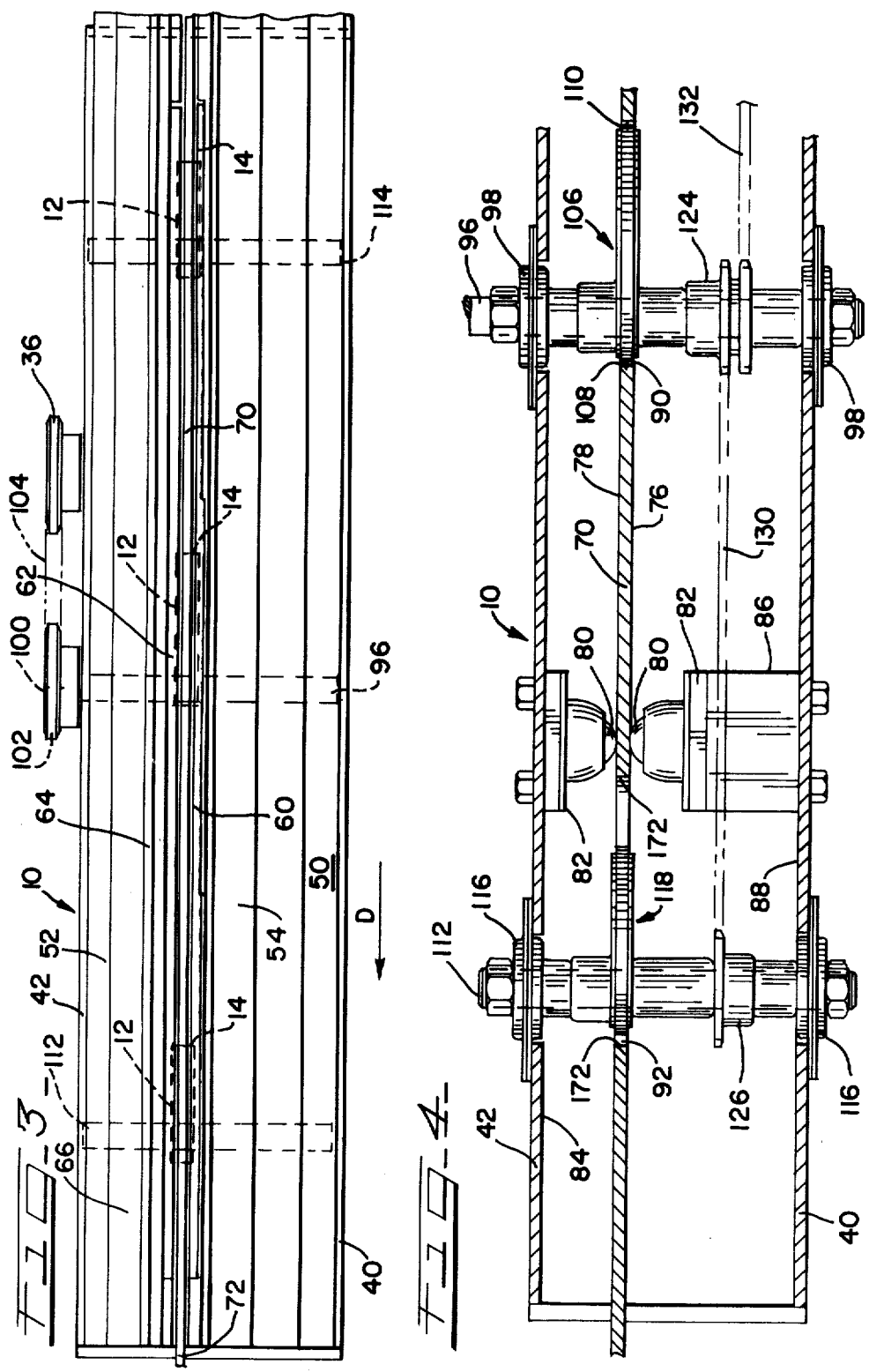

WALKING-BEAM CONVEYOR WITH ADJUSTABLE WIDTH GAUGING APERTURE

BACKGROUND OF THE INVENTION

1. Field of the Invention

This invention relates to conveying devices and more particularly to those conveying devices which may receive in a sequential manner objects to move those objects from an entrance point to a discharge point and provide for accumulation and storage of the objects if so required. The conveying device may include a sorting means to separate the objects into groups having like physical characteristics.

2. Description of the Prior Art

Conveying devices for moving objects between two points are well known. In its simplest form, such a device may provide only a transportation function between work stations, for example. Other conveying devices may provide additional functions such as storage, accumulation and sorting of the objects into distinct groups.

A belt conveyor is an example of a conveying device which primarily provides transportation but could also provide limited storage.

Another example of a conveying device is disclosed in U.S. Pat. No. 3,613,869 issued to the same inventor as is the applicant herein. This device provides transportation, storage and accumulation. Other conveying devices of this applicant are disclosed in U.S. Pat. No. 4,155,443 and in co-pending application Ser. No. 903,951.

In all cases, the configuration and physical characteristics of the objects to be conveyed must be considered in relation to the function to be provided by the conveying device. For example, where storage by accumulation is to be supplied, damage to the objects caused by interaction therebetween must be considered also.

When the objects are to be separated into groups having a like characteristic, means must be provided to first identify that characteristic. Where the characteristic is alike for all the objects but differs in magnitude, means must also be provided to distinguish differences in magnitude of that characteristic.

One example of combining transportation and sorting is the separation of pieces of fruit into a first group which has been pitted and a second group of pieces of fruit which may contain pits. The pieces of fruit are first transported to a pitting station where the pits are to be individually removed. By sensing the presence or absence of the separated pit, the pieces of fruit then may be sorted to a first group which is pit free and a second group which may still contain their pits.

SUMMARY OF THE INVENTION

The conveying device of this invention includes an entrance point to receive objects in a sequential manner. The objects are loosely positioned between a pair of spaced guides. To prevent the objects from falling through the guides, a stop is provided.

Below the stop and between the guides is a top edge of a drive plate. The plate is operatively connected to an eccentric drive means which rotates the drive plate in an elliptical-like pattern or cycle which is predominantly horizontal. The eccentric drive means is such that the pattern of the movement of the drive plate may be modified so as to increase or decrease the amount of either the horizontal or vertical portion of the cycle.

During an upward portion of this cycle, the top edge of the drive plate engages a bottom of each object to lift and move it forward. As the plate moves into a downward portion of this cycle, the objects continue to move forward until they are lowered sufficiently to re-engage with the stop. The top edge of the drive plate then drops below the stop. The point of re-engagement is forward of the point of initial engagement. By each successive completion of the cycle of the drive plate, the objects are stepped from the entrance point to the discharge point or against a blocking device for accumulation.

Where the conveyor is to include a sorting function, the stop is segmented to provide a selective clearance between the stop and the opposing guide. The clearance may be increased in increments such that objects of the smallest cross-sectional dimension fall below the stop as the drive plate reciprocates toward its low point while objects having a greater cross-sectional dimension are retained by the stop. An inclined guide located adjacent to one side of the drive plate allows the objects which have fallen below the stop to be directed from the conveyor to an external collection area. Objects having increasing greater cross-sectional dimension may be successively so separated in groups. Any oversized pins may continue past the sorting means to the discharge point.

The conveyor of this invention has several important advantages over known conveyors.

First, the conveyor can be used to transport a variety of objects from point to point.

Secondly, the conveyor maintains the spaced relationship between the objects during such movement. Thus, the opportunity for end to end contact between objects is minimized so as to inhibit damage.

Thirdly, because the drive plate may be reciprocated in a horizontal elliptical-like pattern, horizontal movement of the object is maximized and vertical movement minimized.

Further, the conveyor may be segmented to provide one portion with a drive plate having a lesser horizontal pattern and a greater vertical pattern. Where the conveyor includes a sorting feature, this modification insures that the drive plate drops sufficiently below the stop to provide sufficient clearance allowing the objects to be ejected from the conveyor.

Lastly, because the conveyor may be readily divided into distinct portions, the conveyor can be formed in various configurations between the entrance and exit points to provide, for example, lifting and lowering portions to raise or lower the objects to different elevations.

DESCRIPTION OF THE DRAWINGS

FIG. 1 is a fragmentary side elevational view of a typical portion of the conveyor of this invention.

FIG. 2 is an end elevational view of the conveyor portion of FIG. 1.

FIG. 3 is a plan view of the conveyor portion of FIG. 1.

FIG. 4 is a cross-sectional view of the conveyor as generally seen along the line 4—4 in FIG. 1.

DESCRIPTION OF THE PREFERRED EMBODIMENT

Figure 5:
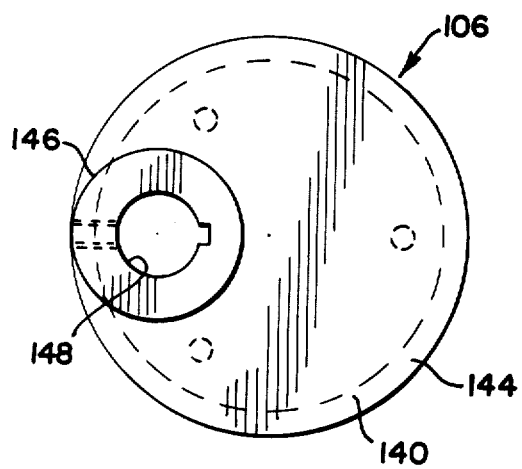
FIG. 5 is a side elevational view of a cam assembly forming part of the conveyor portion of FIG. 1.

A fragmentary portion of a conveyor of this invention is shown generally and designated 10. It should be understood that the conveyor 10 may be made in a variety of configurations and may include ascending and descending sections to provide numerous movement paths between an entrance point and an exit point (not shown). It is anticipated that objects 12 move in the direction of an arrow D seen in FIGS. 1 and 3. In this embodiment, the conveyor 10 is particularly adapted for conveying piston pins 14 which have an elongated cylindrical configuration.

The conveyor 10 includes a base 16 to which are connected vertical uprights 18. The base 16 and the uprights 18 may be conveniently made of structural angle. Carried by the base 16 is a base plate 20 which in turn supports a drive assembly 22 comprising a motor 24 and a gear reducer unit 26 having a reduction ratio of 50 to 1. A drive shaft 28 of the motor 24 connects with an input shaft 30 of the gear reducer unit 26 through a flexible coupling 32. On an output shaft 34 of the gear reducer 26 is a chain drive sprocket 36.

Attached to upper ends of the uprights 18 are horizontal angles 38 which in turn carry a pair of spaced channel frame members 40, 42. The channel members 40, 42 are so oriented that a top and a bottom flange 44, 46 extends outwardly.

Fastened to the top flange 44 of each frame member 40, 42 is an elongated support bar 50, 52 which projects inwardly. Adjustably attached to the support bar 50 is a stop plate 54 having an upwardly inclined end portion 56 which terminates at a vertical end wall 58. The stop plate 54 in turn carries a guide angle 60 forming a guide path 62 with a guide plate 64 which is connected to a support angle 66. The support angle 66 is in turn adjustably attached to the support bar 52.

The position of the guide angle 60 and the guide plate 64 may be adjusted to vary a width of the guide path 62 so as to provide a loose fit for the piston pins 14. Additionally, the position of the stop plates 54 may be adjusted to vary the distance between the stop plate end wall 58 and the guide plate 64 and thus prevent the pins 14 from dropping through the guide path 62.

Positioned between the guide angle 60 and the guide plate 64 is a drive plate 70. This drive plate 70 may be made in sections depending upon the overall length of the conveyor 10. The drive plate 70 has a horizontal top edge 72 prepared to contact a bottom portion 74 of the pins 14 during operation of the conveyor 10. To maintain the drive plate 70 in vertical alignment and allow the plate 70 to move both horizontally and vertically, outer sides 76, 78 of the drive plate 70 interface with an adjustable ball roller portion 80 of a series of opposing pairs of ball transfers 82. One of the ball transfers 82 of each pair is attached to an inner side 84 of the frame member 42. The other ball transfer 80 of each pair is carried by bracket 86 attached to an inner side 88 of the frame member 40.

As best understood by viewing FIG. 1, the drive plate 70 is formed having a centrally located vertical slot 90 and a pair of spaced horizontal slots 92, 94 located on each side of the vertical slot 90. Extending through the vertical slot 90 is a main drive shaft 96 having its end journaled in bearing blocks 98 which are attached to the frame members 40, 42 respectively. One end 100 of the drive shaft 96 extends outwardly from the bearing block 98 and carries a driven chain sprocket 102. The drive shaft 96 is operatively connected to the drive assembly 22 by a drive chain loop 104 carried by the chain sprockets 36 and 102. A first eccentric assembly 106 is keyed to the main shaft 96 and interacts with vertical sidewalls 108, 110 of the vertical slot 90.

Extending through each of the horizontal slots 92, 94 is a secondary drive shaft 112, 114 which have their ends journaled in like bearing blocks 116. In a like manner, the bearing blocks 116 are attached to the frame member 40, 42. Keyed to each of the secondary shafts 112, 114 is a second eccentric assembly 118 which interacts with a top and a bottom wall 120, 122 of the horizontal slots 92, 94.

Between the side frame 40 and the first eccentric assembly 106 and keyed to the main drive shaft 96 is a dual chain sprocket 124. Between the side frame 40 and the second eccentric assemblies 118 are single sprockets 126, 128 which are keyed to the secondary shafts 112, 114, respectively. A chain loop 130 connects the dual sprocket 124 with the sprocket 126 while another chain loop 132 connects the dual sprockets 124 with the sprocket 128.

The first and the second eccentric assemblies 106, 118 are similar in construction but different in size. For example, the first eccentric assembly 106 is formed to have proximately a 1½ inch eccentricity while each of the secondary assemblies 118 has proximately a 1 inch eccentricity. The purpose of having a difference in the amount of eccentricity will be explained subsequently. Because of the similarity in construction, only one eccentric assembly will be described in detail, for example the first eccentric assembly 106.

Figure 6:
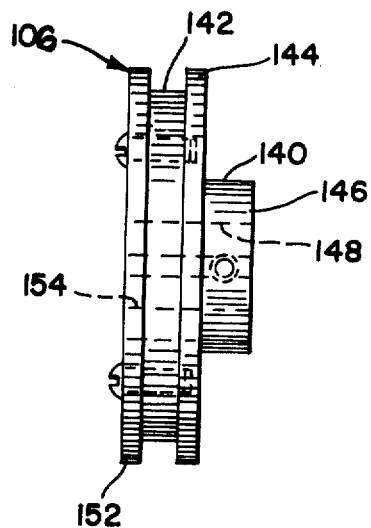
FIG. 6 is an end elevational view of the cam assembly of FIG. 5.
Figure 7:
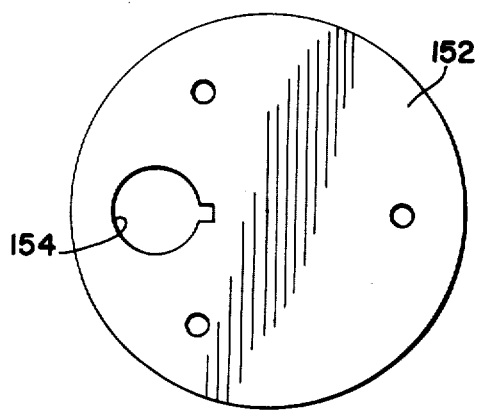
FIG. 7 is a view of a retaining plate forming part of the cam assembly of FIG. 5.
Figure 8:
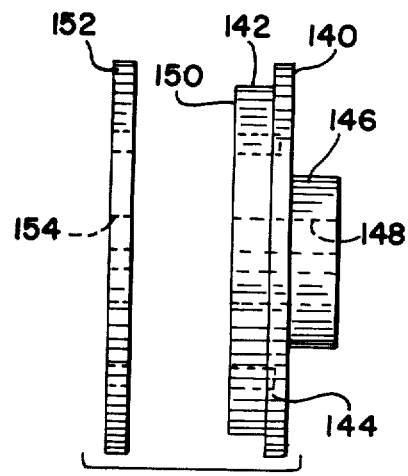
FIG. 8 is an end elevational view of the cam assembly of FIG. 5 in a disassembled state.

The eccentric assembly 106 as seen in FIGS. 5-8 includes a hub portion 140 defined by an inner circular slide section 142 affixed to an outer circular guide flange 144. The guide flange 144 has a greater diameter than that of the slide section 142. On a side of the guide flange 144 opposite the slide section 144 is an annular boss 146 which is offset from a center of the hub portion 140. A key slotted aperture 148 extends through the boss 146, the guide flange 144 and slide section 142. Detachably secured to an outer surface 150 of the hub slide section 142 is a circular retaining plate 152. The plate 152 has the same diameter as the hub guide flange 144 and is formed with a key slotted aperture 154 positioned to align with the hub aperture 148 when the plate 152 is fastened to the hub portion 140. The slide section 142 of the eccentric assembly hub portion 140 is designed to interact with the drive plate 70 as noted earlier and may be hardened to improve wear characteristics.

In a modified form of the eccentric assembly 106, the slide section 142 may be made of a lesser diameter so as to accommodate a ball bearing (not shown), an outer race of which interacts with the drive plate 70.

When the conveyor 10 is to include means for sorting the pins 14, the side frame 40 is provided with a series of elongated openings 156. The number of openings 156 may equal the number of groups into which the pins 14 are to be divided. In the present embodiment, two such openings 156a,b are shown. Adjoining a lower edge 158 of the opening 156 is a bottom edge 160 of an inclined slide plate 162 carried by spaced brackets 164 attached to the inner side 88 of the frame member 40. A top edge 166 of the slide plate 162 extends upwardly and terminates adjacent to the outer side 76 of the drive plate 70. Attached to the guide plate 64 is a deflection bar 168 which is located opposite to and has a top surface 170 slightly above the slide plate top edge 166.

During operation of the conveyor 10, the pins 14 are fed in a sequential manner into the guide 62 and come to rest on the stop plate 54. Assuming that the motor 24 is energized and has an output proximating 1750 r.p.m., the output from the gear reducer unit 26 is slowed to about 35 r.p.m.

As may be seen in FIG. 1, the orientation of the main drive shaft 96 and the secondary shaft 112, 114 is such that their respective keyways and thus the first eccentric assembly 106 and the second eccentric assemblies 118 are similar. Each of the assemblies 106 and 118 has been rotated to have its outermost point of eccentricity to align radially and as shown align with a horizontal axis passing through a center of each of the shafts 96, 112 and 114.

The location of the secondary eccentric assemblies 118 within the drive plate horizontal slots 92, 94 as well as the horizontal dimension of each slot 92, 94 is such that no contact is made between the secondary eccentric assemblies 118 and radiused end walls 172 of the two slots 92, 94 during rotation thereof. All horizontal movement of the drive plate 70 is provided by the first eccentric assembly 106 in contact with the drive plate vertical slot sidewalls 108, 110. Likewise, the height of the vertical slot 90 is such that no contact is made between the first eccentric assembly 106 and a roof 174 of the vertical slot 90. All vertical movement of the drive plate 70 is provided by the second eccentric assemblies 118 in contact with the drive plate horizontal slot top and bottom walls 120, 122.

Because the first eccentric assembly 106 has a greater eccentricity than the secondary assemblies 118, the pattern of movement of the drive plate 70 is elliptical-like with a major diameter of such being horizontally disposed. Use of such a movement pattern maximizes conveyor efficiency since horizontal movements may be maximized and vertical movements minimized.

During an upward and forward portion of the rotation cycle of the drive plate 70, the top edge 72 of the drive plate 70 comes into contact with the bottom portion 74 of the pins 14 and lifts the pins 14 upward from the stop plate 54 and carries such in the forward direction. As the plate 70 continues past the uppermost point in the cycle, the plate 70 continues to carry the pins 14 forward but lowers such until the pins 14 again contact the stop plate 54. As the drive plate 70 continues in its cycle toward a bottommost point, contact between the top edge 72 of the drive plate 70 and the pins 14 terminates. In a like manner, contact is again made in the next cycle of the drive plate 70 to carry the pins further forward. During the rotation of the drive plate 70, the ball transfers 82 maintain the vertical position of the plate 70 while offering only a negligible resistance to movement of the plate 70 as the pins are stepped from the entrance point to the discharge point.

Note that when a blocking device is provided at the discharge point, forward movement of the pins 14 may be halted. If such occurs, the pins 14 accumulate and are stored as the conveyor 10 continues to operate.

When groups of pins 14 having different diameters have become inadvertently commingled, the sorting feature described earlier may be used to separate the pins 14 into groups having like diameters. Assuming that there are three such groups, for example pins 14a, 14b and 14c, the stop plate 54 would be divided into at least two sections 54a and 54b. Section 54a would be associated with the openings 156a and positioned such that the distance between its stop plate end wall 58a and the guide plate 64 would provide clearance for the group of pins 14a having the smallest diameter to fall past the stop plate end wall 58a but inhibit the pins 14b,c having a greater diameter. The position of the stop plates 54b associated with the opening 156b is likewise adjusted to provide an opening between the stop plate end wall 58b and the guide plate 64 to allow the group of pins 14b having the next smallest diameter to pass the stop plate end wall 58b. The group of pins 14c having the largest diameter would fall past a stop plate 54c and through an associated opening 156c. Any oversized pins would be stepped to the discharge point and accumulate in a conventional container.

As the drive plate 70 drops below the stop plate 54, for example the stop plate 54a, a pin of the 14a group having the smallest diameter would continue downward in contact with the top edge 72 of the drive plate. The position of deflection bar 168 is such that the pin 14a would strike the top surface 170 of the bar 168 and be deflected sideways onto the slide plate 162. The inclined end portion 56 of the stop plate 54 provides clearance for the pin 14a to move down the slide plate 162 and be ejected from the opening 156a. The pins of the 14b and 14c groups would be separated and ejected in a like manner.

While various modifications may be suggested by those versed in the art, it should be understood that I wish to embody within the scope of the patent warranted hereon all such modifications as reasonably and properly come within the scope of my contribution to the art.

What is claimed is:

1. A conveyor for moving objects by means of a series of successive steps wherein said objects are lifted from rest at a first point, carried forward and then returned to rest at a second point located a distance from said first point, said conveyor comprising, a conveyor body, a drive plate carried by said body, said plate having a centrally located first slot defined in part of spaced vertical sidewalls, and a pair of second slots located one each on each side of said first slot, each said second slot defined by a horizontal top wall spaced from a horizontal bottom wall, a first eccentric assembly rotatively carried by said body and disposed within said first slot to interact continuously with said sidewalls of said first slot, second eccentric assemblies rotatively carried by said body and disposed one each in said second slots to interact continuously with said top walls of each said second slot, said first and second eccentric assemblies operatively interconnected and positioned to rotate and maintain respective outermost eccentric points in like orientation during said rotation, said second eccentric assemblies having a lesser eccentricity than said first eccentric assembly so that said drive plate may rotate in a pattern having a horizontal elliptical-like configuration, and a stop plate carried by said body below a guide path of said conveyor defined by a guide angle and a guide plate, said stop plate having an end wall located a selective distance from said guide plate to provide a space for said drive plate to move into said guide path, engage objects held in said guide path by said stop plate and carry said objects from said first point to said second point, said conveyor further characterized by including a sorting feature comprising, an aperture formed in one side of said conveyor body, a slide plate having a bottom edge joined to said body immediately below a lower edge of said aperture, said plate sloped upwardly and terminating adjacent to said drive plate, a deflection bar carried by said guide plate adjacent to said drive plate, and said stop plate including an adjustable portion positioned to align with said aperture and having an end wall positioned to provide a clearance space for a portion of said objects to selectively pass therethrough, engage said deflection bar and be ejected through said aperture.

2. A conveyor particularly adapted for moving piston pins from an entrance point to a discharge point, said piston pins being horizontally disposed and fed into said conveyor sequentially at said entrance point, said conveyor comprising, a first and second spaced elongated frame member each having a channel-like configuration with a top and a bottom flange extending outwardly therefrom, a stop plate attached to said first channel member top flange, extending inwardly and terminating at an end wall, a guide angle carried by said stop plate, a guide plate attached to said top flange of said second frame member and forming a guide path with said guide angle to receive therein said piston pins with a loose fit, said stop plate positioned to inhibit downward movement of said pins in said guide path, a drive plate carried vertically between opposing pairs of ball transfer devices attached to said frame members respectively and positioned to have a top edge reciprocate within said guide path, a main drive shaft having ends journaled in bearings carried by said channel members, respectively, one end of said shaft prepared to be operatively connected to a source of rotary power having a selectively slow output, a pair of spaced secondary shafts each having ends journaled in bearings carried by said channel members respectively, one each of said secondary shafts located on each side of said main drive shaft, said secondary shafts operatively connected to said main drive shaft so as to be rotated in unison therewith, a first eccentric assembly having an offset aperture with said main drive shaft disposed therein, said first eccentric assembly having a circular slide section positioned between a guide flange and a detachable retainer plate, said first eccentric assembly disposed in a vertical slot formed in said drive plate with said slide section engaged with vertical sidewalls of said slot, and a pair of second eccentric assemblies each having an offset aperture with one each of said secondary shafts disposed therein, each of said second eccentric assemblies having a circular slide section positioned between a guide flange and a detachable retainer plate, said second eccentric assemblies disposed one each in a pair of spaced horizontal slots formed in said drive plate with each said slide section engaged with a horizontal top and bottom wall of said horizontal slots respectively, said first and second eccentric assemblies carried by said respective shafts so as to have an outermost point of eccentricity in radial alignment, wherein said drive plate is moved horizontally by rotation of said first eccentric assembly and vertically by said second eccentric assemblies so that said top edge of said drive plate lifts said pins from said stop plate at a first point, carries said pins forward, and lowers said pins to re-engage said stop plate at a point forward to said first point whereby said pins may be stepped from said entrance point to said discharge point and accumulated and stored if so required.

3. A conveyor as defined by claim 2 and further characterized by including a sorting device to separate said pins into groups wherein pins comprising each group have a similar diameter, said sorting device comprising, at least one elongated horizontal opening formed in said first channel member, inclined brackets carried one each by said first frame member one each side of said elongated opening, a slide plate affixed to said brackets, a bottom edge of said plate aligned with a lower edge of said opening and a top edge of said plate positioned above said channel member opening and terminating immediately adjacent to said drive plate and below an inclined end portion of said stop plate to provide an ejection space to receive a pin therethrough, and a deflection bar carried by said guide plate immediately adjacent to said drive plate on a side opposite said slide plate, a top edge of said deflector bar positioned above said top edge of said slide plate to engage said pin passing between said guide plate and said end wall of said stop plate, wherein a position of said stop plate is adjusted to provide a clearance space between said stop plate end wall and said guide plate to allow a pin having a selectively smaller diameter to remain engaged with said top edge of said drive plate, drop below said stop plate to contact said deflection bar and be impelled through said ejector space, onto said slide plate and through said frame opening for accumulation external to said conveyor.

4. A conveyor for moving objects between a first and a second point with a path of movement of said objects being a substantially straight line and with said movement of said objects being intermittent, said conveyor comprising, a conveyor body, a stationary guide carried by said body and defined by spaced guide plates extending between said first and second points, a drive plate having a top portion positioned between said guide plates with a top edge of said plate being substantially aligned with said stationary guide, ball transfer means extending inwardly from spaced channel frame members carried by said body, said means in contact with sides of said drive plate to allow said plate to move in a plane aligned with said path of movement and maintain said plate in said plane, a first slot means formed in said drive plate and having spaced sidewalls positioned substantially perpendicular to said plate top edge, a second slot means comprising a pair of slots formed in said drive plate proximate said first and second points respectively, each said slot having a top wall substantially aligned with said plate top edge, a first eccentric means comprising an eccentric assembly disposed on a shaft extending through said first slot with ends of said shaft rotatively carried by said channel frame members, said assembly including a slide section in contact with said first slot sidewalls, a second eccentric means comprising a pair of eccentric assemblies disposed one each on shafts extending through said second slots respectively with ends of said shafts rotatively carried by said channel frame members, each said assembly including a slide section in contact with said top wall of said slot, and operative means connecting said first and said second eccentric means to a source of rotary power, said operative means maintaining an outermost point of eccentricity of said first and second eccentric means in radial alignment during rotation of said eccentric means, wherein said drive plate may be rotated in an elliptical-like pattern by said first eccentric means having a greater degree of eccentricity than said second eccentric means.

* * * * *